US012698714B1

(12) United States Patent
Harner et al.

(10) Patent No.: US 12,698,714 B1
(45) Date of Patent: Aug. 4, 2026

(54) ADHESIVE-REINFORCED ALUMINUM HOLLOW FAN BLADE FOR BONDED COVER RETENTION

(71) Applicant: Raytheon Technologies Corporation, Farmington, CT (US)

(72) Inventors: John Harner, Florence, MA (US); Xiaomei Fang, South Glastonbury, CT (US); Kerry E. Muenchow, Glastonbury, CT (US); John Austin Bayliff, West Hartford, CT (US); Andrew Hathcock, Weatogue, CT (US); Rachel Boislard, Willimantic, CT (US); David J. Mathiau, Jr., East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/334,173

(22) Filed: Jun. 13, 2023

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F01D 5/288* (2013.01); *F05D 2230/23* (2013.01); *F05D 2230/90* (2013.01); *F05D 2300/431* (2013.01); *F05D 2300/603* (2013.01); *F05D 2300/611* (2013.01)

(58) Field of Classification Search
CPC ................ F01D 5/147; F05D 2230/90; F05D 2300/431; F05D 2300/603; F05D 2300/611
See application file for complete search history.

(56) References Cited

U.S. PATENT DOCUMENTS 5,791,879 A * 8/1998 Fitzgerald ............ F04D 29/324 416/229 R
7,334,997 B2 * 2/2008 Karafillis ................ F01D 5/34 416/224
8,282,042 B2 10/2012 Parikh et al.
9,169,731 B2 * 10/2015 Hui ...................... F04D 29/023
2003/0012922 A1 1/2003 Heath
(Continued)

FOREIGN PATENT DOCUMENTS

EP 3044415 B1 1/2019
EP 3385026 B1 9/2020
(Continued)

OTHER PUBLICATIONS

Blanquart, WO2019186029A1 English Translation, 2019 (Year: 2019).*
(Continued)

*Primary Examiner* — Michael L Sehn
(74) *Attorney, Agent, or Firm* — CANTOR COLBURN LLP

(57) ABSTRACT

Disclosed herein is a blade for an engine comprising a blade cover and a blade body. A first adhesive bond is disposed between the blade cover and the blade body. A second adhesive layer is disposed on a surface of the blade cover and a periphery of the blade body that surrounds the blade cover. The second adhesive layer is in a protective relationship with portions of the first adhesive bond that are exposed to the atmosphere in the absence of the second adhesive layer.

16 Claims, 4 Drawing Sheets

(56) References Cited

U.S. PATENT DOCUMENTS

| | | | | |
|---|---|---|---|---|
| 2006/0281861 | A1* | 12/2006 | Putnam | C09D 127/18<br>106/13 |
| 2011/0211965 | A1* | 9/2011 | Deal | F02K 3/04<br>416/223 R |
| 2013/0220536 | A1 | 8/2013 | Parkin et al. | |
| 2016/0024943 | A1 | 1/2016 | Hyatt et al. | |
| 2016/0177732 | A1* | 6/2016 | Whitehurst | F01D 5/28<br>416/241 A |
| 2020/0240272 | A1* | 7/2020 | Merriman | F04D 29/164 |
| 2020/0300093 | A1* | 9/2020 | Drescher | B22F 10/20 |

FOREIGN PATENT DOCUMENTS

| | | | | |
|---|---|---|---|---|
| FR | 3043686 B1 | | 2/2020 | |
| WO | WO-2019186029 A1 | * | 10/2019 | B29C 65/02 |

OTHER PUBLICATIONS

3M, Adhesive Film AF191 Properties (Year: 2024).*
Search Report issued in European Patent No. 24181736.0; Date of Mailing Nov. 18, 2024 (6 pages).

* cited by examiner

ADHESIVE-REINFORCED ALUMINUM HOLLOW FAN BLADE FOR BONDED COVER RETENTION

BACKGROUND

This disclosure relates to an adhesive-reinforced aluminum hollow fan blade for bonded cover retention. Fan blades such as, for example, those used in geared turbofan (GTF) engines comprise a blade body and a blade cover. The blade body and blade cover are often adhesively bonded to each other using a polymeric adhesive. Elastomer-based adhesives and epoxy-based adhesives are often used to bond the blade cover to the blade body. Elastomer-based adhesives provide excellent flexibility and impact resistance when used to bond the aluminum cover to the aluminum blade body. Epoxy-based adhesives, on the other hand, display enhanced bond performance at elevated temperatures and superior environmental durability. However, epoxy-based adhesives are less flexible than the elastomer-based adhesives.

FIG. 1 depicts a hollow blade 30 comprising an airfoil 32, sheath 34, and root 36. Blade 30 includes leading edge 38, trailing edge 40, suction surface 42, pressure surface (opposite to the suction surface 42 and which is not visible in FIG. 1), platform 46, tip edge 48, cavity cover 50 (also referred to herein as the blade cover 50), and socket 52 (also referred to herein as the blade body 52). Airfoil 32 is a hollow aerodynamic structure. Root 36 links blade 30 at platform 46 to a disk or rotor (not shown). Cavity cover 50 engages with socket 52, covering an opening and completing a continuous first surface of blade 30. The blade cover 50 is adhesively bonded to the blade body 52 via an adhesive bond that lies between the blade cover and the blade body. This adhesive bond is referred to herein as the blade cover bond.

Stress concentration varies with location on the blade cover bond due to the different loading levels that different portions of the fan blade experience in service. Some locations require higher shear and peel bond strength than others. High cover bond strength, greater bond-line damage growth resistance and enhanced long-term bond durability are therefore desirable for fan blade quality and engine safety. Moisture ingress into the blade cover bond also reduces the adhesive bond stability over time. The combination of moisture ingress together with operational stresses that the fan blades are subjected to facilitates the formation of cracks, which exacerbates exposure risk. Seals around the joint between the fan blade body and the fan blade cover can provide some protection from moisture ingress but does not eliminate the risk. In addition, the presence of a seal necessitates an additional manufacturing step and adds to the cost of the fan blade.

It is therefore desirable to protect the adhesive bond from moisture ingress so that fan blades can function unimpeded over extended lengths of time without any degradation or damage.

BRIEF DESCRIPTION

Disclosed herein is a blade for an engine comprising a blade cover and a blade body. A first adhesive bond is disposed between the blade cover and the blade body. A second adhesive layer is disposed on a surface of the blade cover and a periphery of the blade body that surrounds the blade cover. The second adhesive layer is in a protective relationship with portions of the first adhesive bond that are exposed to the atmosphere in the absence of the second adhesive layer.

In an aspect, the first adhesive bond comprises a polyurethane elastomer.

In another aspect, the second adhesive layer comprises a polyepoxide adhesive.

In yet another aspect, the second adhesive layer comprises an adhesive that has a greater strength and stiffness as compared with an adhesive that is used in the first adhesive bond.

In yet another aspect, the adhesive used in the first adhesive bond has a greater toughness and impact strength when compared with the adhesive that is used in the second adhesive layer.

In yet another aspect, an erosion-resistanterosion-resistant coating is disposed on the second adhesive layer.

In yet another aspect, the erosion-resistanterosion-resistant coating comprises an elastomer.

In yet another aspect, the elastomer comprises a silicon atom, a fluorine atom, or both a silicon atom and a fluorine atom.

In yet another aspect, the elastomer comprises a polysiloxane elastomer, a fluorosilicone elastomer, a fluoroelastomer, a perfluoroelastomer, or a combination thereof.

In yet another aspect, the second adhesive layer contacts the first adhesive bond along an outer periphery of the blade cover.

In yet another aspect, the blade body and the blade cover both comprise one of aluminum, a ceramic matrix composite, or fiber-glass.

In yet another aspect, the fiber-glass comprises glass fibers and a polyepoxide or carbon fibers and a polyepoxide.

In yet another aspect, the second adhesive layer has a decreased moisture permeation rate compared with the first adhesive bond.

Disclosed herein is a method for manufacturing a blade for an engine comprising applying a layer of adhesive precursor to an inner surface of a blade cover and applying the inner surface of the blade cover to a blade body. The layer of adhesive precursor is cured to form a first adhesive bond between the blade cover and the blade body. A second adhesive layer is applied to a surface of the blade cover that is opposed to the inner surface and the blade body that surrounds the periphery of the blade cover. The second adhesive layer is in a protective relationship with portions of the first adhesive bond that are exposed to the atmosphere in the absence of the second adhesive layer.

In an aspect, the first adhesive bond comprises a polyurethane elastomer.

In yet another aspect, the second adhesive layer comprises a polyepoxide adhesive.

In yet another aspect, the second adhesive layer comprises an adhesive that has a greater strength and stiffness as compared with an adhesive that is used in the first adhesive bond.

In yet another aspect, an erosion-resistanterosion-resistant coating is disposed on the second adhesive layer.

In yet another aspect, the erosion-resistanterosion-resistant coating is applied via a spray coating or electrostatic spray painting.

In yet another aspect, the second adhesive layer is applied via a spray coating, painting, dip coating, doctor blading or electrostatic spray painting.

In yet another aspect, the second adhesive layer contacts the first adhesive bond along an outer periphery of the blade cover.

In yet another aspect, the erosion-resistanterosion-resistant coating comprises an elastomer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

Disclosed herein is an erosion-resistanterosion-resistant coating that is disposed on a fan blade cover to protect the adhesive bond that facilitates adhesion between the fan body and the fan blade cover. The erosion-resistant coating protects the adhesive bond from moisture ingress and consequent degradation that results in reduced bond strength and reduced thermal stability. Both the blade body and the blade cover are manufactured from aluminum or aluminum alloys thereof and will therefore occasionally be referred to herein as an aluminum fan blade and an aluminum blade cover respectively. The fan blade described herein may be used in any of the blades used in the engine detailed below in the FIG. 2. It is preferably used as a fan blade, but the same principles could be used in other blades (e.g., turbine blades) as desired.

Figure 1:
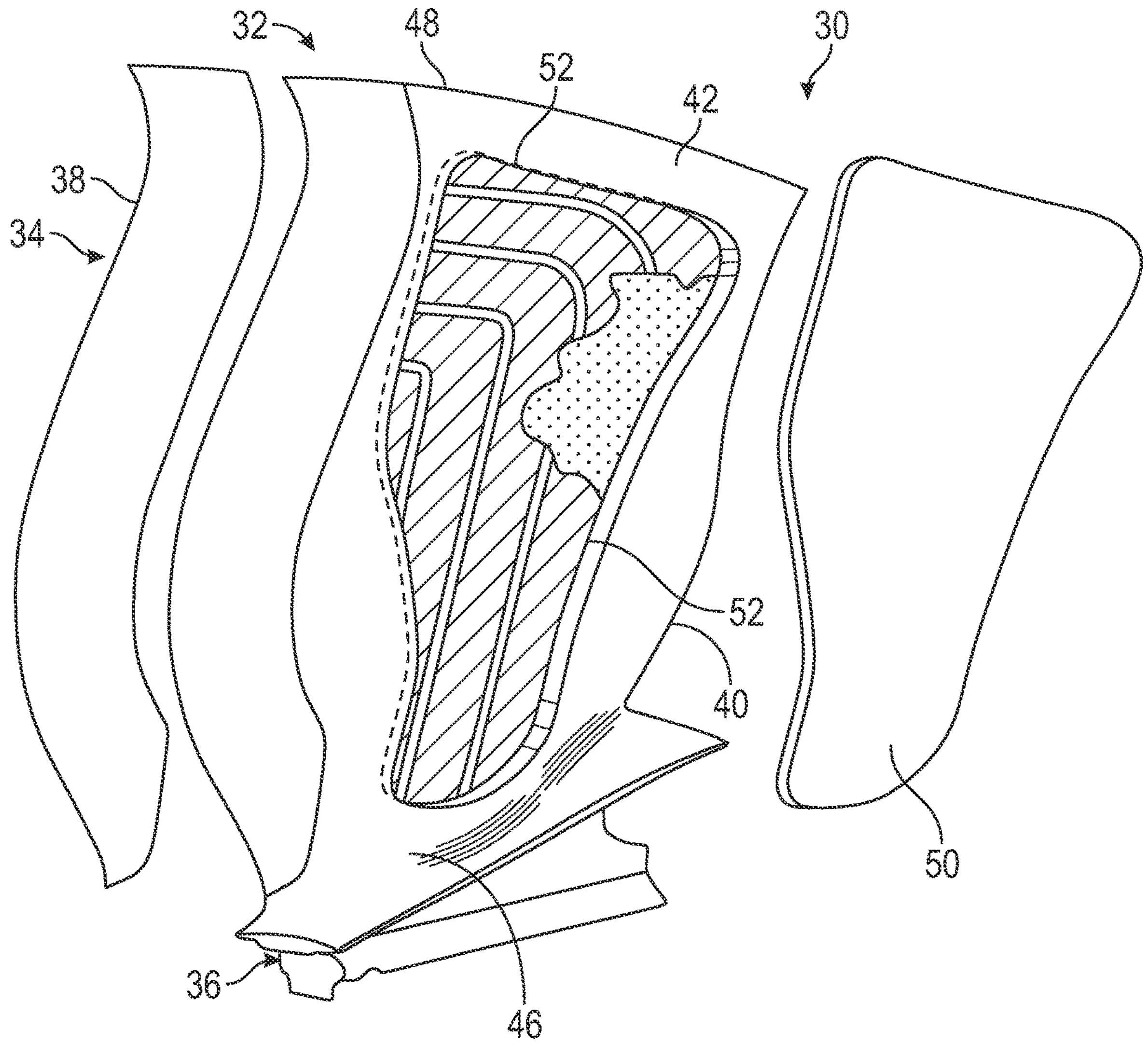
FIG. 1 depicts stress analysis that occurs in the adhesive bond located between the blade cover and the blade body.
Figure 2:
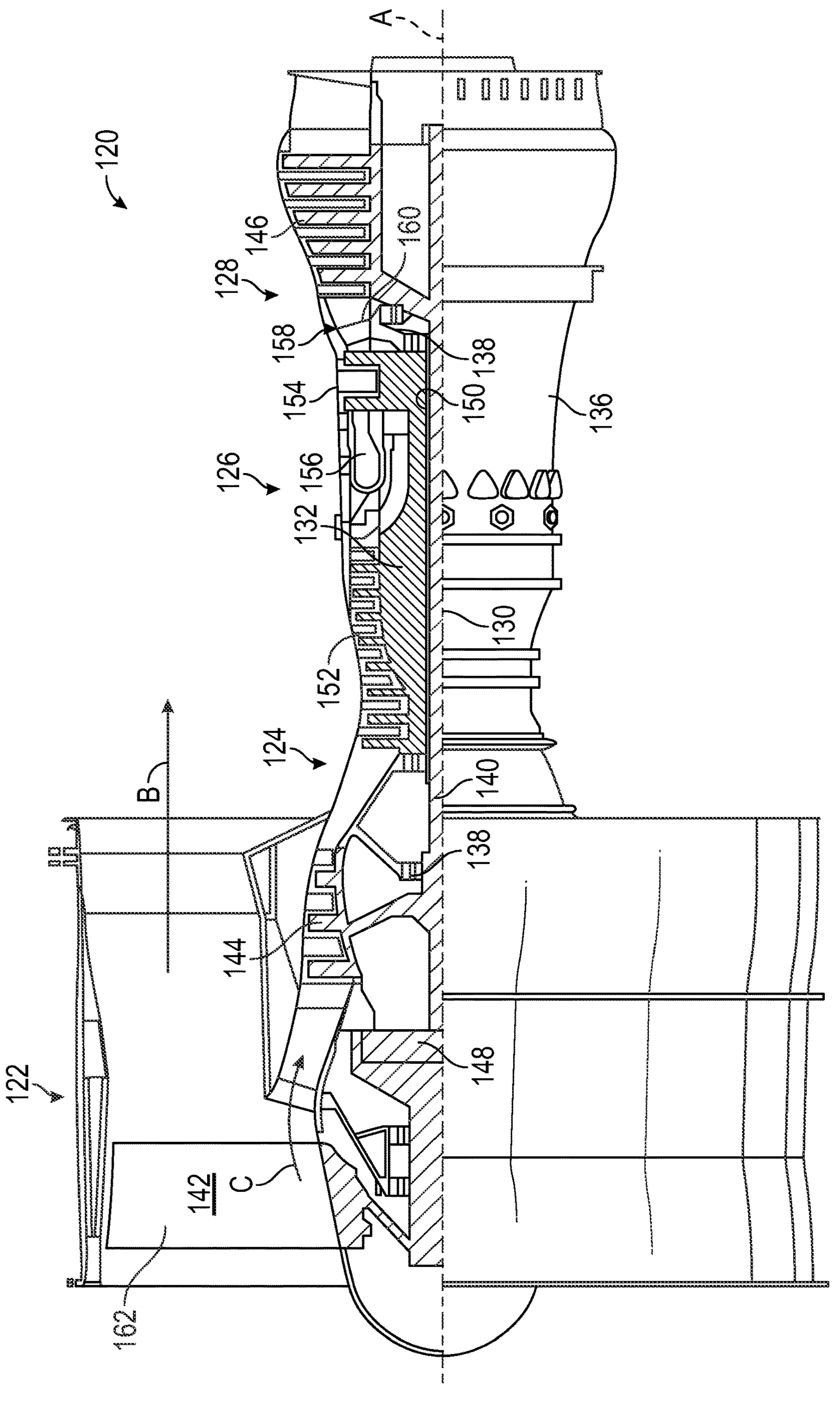
FIG. 2 schematically illustrates a gas turbine engine.

FIG. 2 schematically illustrates a gas turbine engine 120. The gas turbine engine 120 is disclosed herein as a two-spool turbofan that generally incorporates a fan section 122, a compressor section 124, a combustor section 126 and a turbine section 128. Alternative engines might include an augmentor section (not shown) among other systems or features. Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures. The fan section 122 drives air along a bypass flowpath B while the compressor section 124 drives air along a core flowpath C for compression and communication into the combustor section 126 then expansion through the turbine section 128.

The engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided.

The low speed spool 130 generally includes an inner shaft 140 that interconnects a fan 142, a low pressure compressor 144 and a low pressure turbine 146. The inner shaft 140 is connected to the fan 142 through a geared architecture 148 to drive the fan 142 at a lower speed than the low speed spool 130. The high speed spool 132 includes an outer shaft 150 that interconnects a high pressure compressor 152 and a high pressure turbine 154.

A combustor 156 is arranged between the high pressure compressor 152 and the high pressure turbine 154. A mid-turbine frame 158 of the engine static structure 136 is arranged generally between the high pressure turbine 154 and the low pressure turbine 146. The mid-turbine frame 158 further supports bearing systems 138 in the turbine section 128.

The inner shaft 140 and the outer shaft 150 are concentric and rotate via bearing systems 138 about the engine central longitudinal axis A, which is collinear with their longitudinal axes.

The core airflow C is compressed by the low pressure compressor 144, then the high pressure compressor 152, mixed and burned with fuel in the combustor 156, then expanded over the high pressure turbine 154 and low pressure turbine 146. The mid-turbine frame 158 includes airfoils 160 which are in the core airflow path C. The turbines 146, 154 rotationally drive the respective low speed spool 30 and high speed spool 132 in response to the expansion.

A significant amount of thrust is provided by the bypass flow B due to the high bypass ratio. The fan section 122 of the engine 120 is designed for a particular flight condition—typically cruise at about 0.8 Mach and about 35,000 feet (10,668 meters). The flight condition of 0.8 Mach and 35,000 feet (10,668 meters), with the engine at its best fuel consumption, also known as "bucket cruise Thrust Specific Fuel Consumption ('TSFC')," is the industry standard parameter of $lb_m$ (pound-mass) of fuel being burned divided by $lb_f$ (pound-force) of thrust the engine produces at that minimum point.

Figure 3:
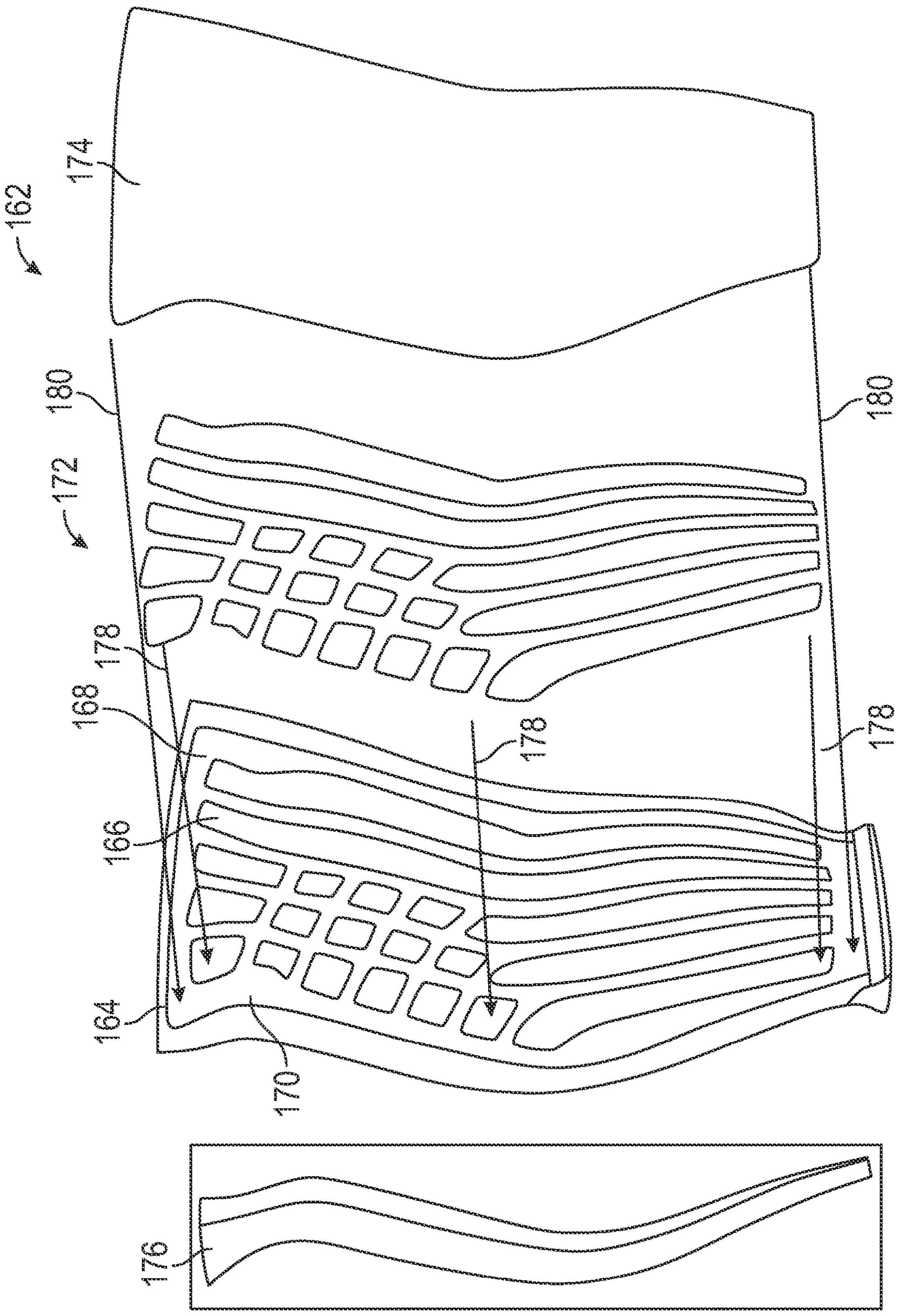
FIG. 3 illustrates an inner surface of a cover of a fan blade with an adhesive applied near an edge.

Aluminum fan blades such as, for example, those used in geared turbofan (GTF) engines comprise an aluminum blade body and an aluminum cover. The fan 142 includes a plurality of hybrid metallic fan blades 162. As shown in FIG. 3, each fan blade 162 includes a blade body 164 having an inner surface 170 including a plurality of cavities 166, such as grooves or openings, surrounded by ribs 168. A plurality of strips or pieces of a low density filler 172 are each sized to fit in one of the plurality of cavities 166. The fan blade 162 also includes a cover 174 and a leading edge sheath 176 attached to the blade body 164. An adhesive layer (termed the first adhesive bond 180) is applied to the cover 174 at its inner surface. The cover 174 with the adhesive bond 180 applied thereto is brought into contact with the blade body 164 and bonded to the blade body 164.

In one example, the blade body 164 is made of aluminum or an aluminum alloy. Employing aluminum or an aluminum alloy for the blade body 164 and the cover 174 provides a cost and weight savings. There is one strip or piece of the low density filler 172 for each of the plurality of cavities 166 of the blade body 164. In one example, the low density filler 172 is a foam. In one example, the foam is aluminum foam. The low density filler 172 is secured in the cavities 166 with an adhesive 178, shown schematically as arrows. In one example, the adhesive 178 is urethane. In another example, the adhesive 178 is an epoxy film.

Figure 4:
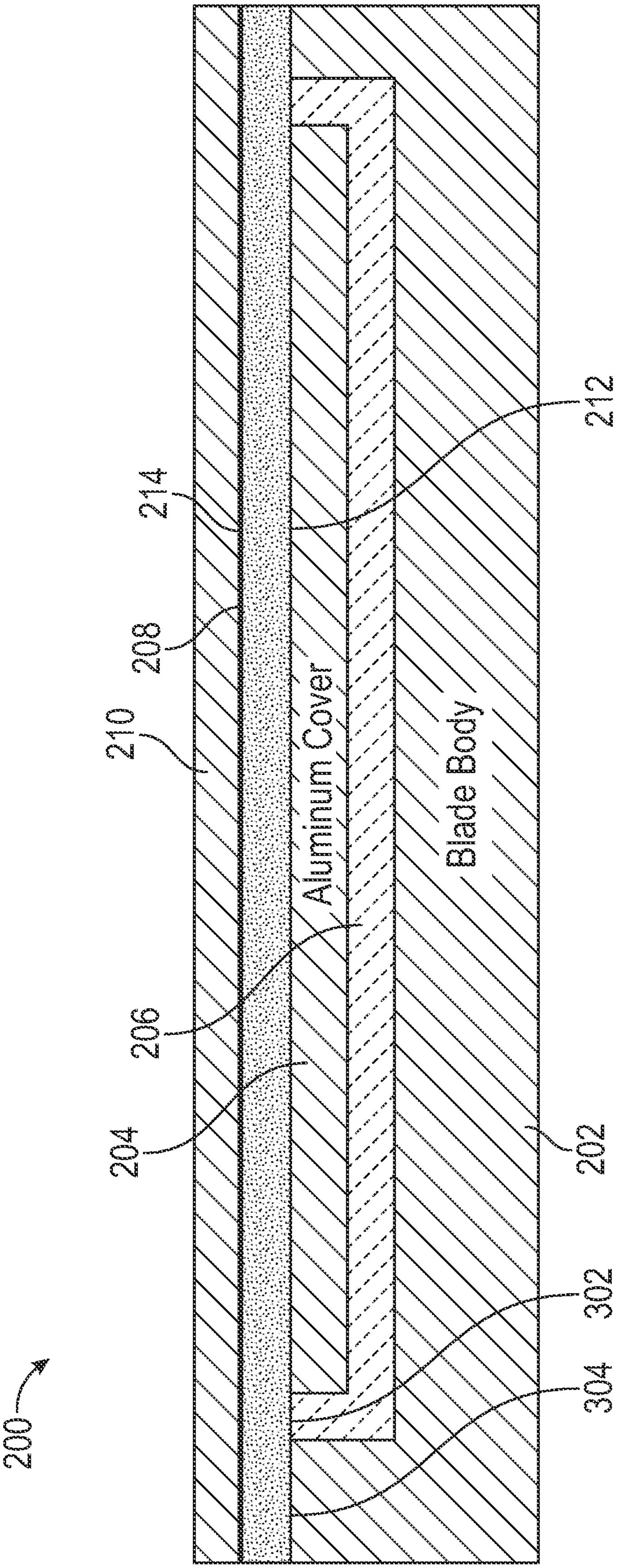
FIG. 4 is a side-view of a cross section of the fan blade.

In a schematic embodiment, depicted in the FIG. 4, the fan blade 200 comprises a fan blade body 202 bonded adhesively to a fan blade cover 204 via a first adhesive bond 206. FIG. 4 is a side-view of a cross section of the fan blade 200. The fan blade body 202 contacts the fan blade cover 204 through the first adhesive bond 206. Disposed on the fan blade cover 204 is a second adhesive layer 208 and an erosion-resistant coating 210. The erosion-resistant coating 210 is disposed on a surface 214 of the second adhesive layer 208 that is opposed to the surface 212 that contacts the fan blade cover 204.

As noted above, the fan blade cover 202 and the fan blade body 204 can both comprise aluminum. In another embodiment, the fan blade cover 202 and the fan blade body 204 can both comprise a ceramic matrix composite. Ceramic matrix composites generally comprise silicon carbide fibers dispersed in a silicon carbide or alumina matrix. In yet another embodiment, the fan blade cover 202 and the fan blade body 204 can both comprise a fiber glass (an epoxy-glass fiber system or an epoxy-carbon fiber system).

The first adhesive bond 206 can comprise an epoxy adhesive (a polyepoxide), a polyurethane adhesive, or a combination thereof. In an embodiment, the epoxy adhesive may be used in a first region (not shown) of the first adhesive bond 206, while the polyurethane adhesive may be used in a second region (not shown) of the first adhesive bond 206, where the first region does not overlap with the second region. In other words, the second region does not contact the first region along a planar areal surface. In an embodiment, the epoxy adhesive surrounds the polyurethane adhesive preventing moisture ingress to the polyurethane adhesive. The polyurethane adhesive is more susceptible to deterioration by moisture and preventing moisture contact with it preserves the first adhesive bond 206 for an extended period of time.

Polyurethane is an elastomeric adhesive that is typically produced by reacting an isocyanate with a polyol. Both the isocyanates and polyols used to make a polyurethane may contain two or more functional groups per molecule. Elastomers typically have an elastic modulus of 80 to 200 Megapascals.

Polyepoxides are generally obtained by polymerizing epoxide monomers have more than one epoxide group. The epoxide monomers can undergo ring-opening polymerization. In an embodiment, the monomers may include aromatic epoxides formed by the epoxidation of phenols. The epoxide monomers can include functional groups, including, but not limited to the ethers, enol ethers, esters, and alcohols. In an embodiment, the epoxide monomers can be halogenated.

In an exemplary embodiment, the first adhesive bond 206 comprises a first adhesive. The first adhesive preferably comprises a polyurethane resin (e.g., a polyurethane elastomer). In an embodiment, the first adhesive comprises a homopolymer, a copolymer, or a blend that comprises a polyurethane polymer. In addition to the polyurethane, the copolymer or the blend may contain a polyacetal, a polyolefin, a polyacrylic, a polyamide, a polyamideimide, a polyarylate, a polyarylsulfone, a polyethersulfone, a polyphenylene sulfide, a polysulfone, a polyimide, a polyetherimide, a polyetherketone, a polyether etherketone, a polyether ketone ketone, a polybenzoxazole, or a combination thereof.

The first adhesive bond 206 contacts an inner surface of the fan blade cover 204 and a surface of the fan blade body opposite to the fan blade cover 204. In an embodiment, the first adhesive bond 206 forms a boundary 302 that surrounds the outer periphery of the fan blade cover 204 and an inner periphery of an opening in the fan blade body (that accommodates the fan blade cover).

Disposed on the fan blade cover 204 is the second adhesive layer 208.

The second adhesive layer 208 functions as an environmental barrier and forms a protective layer for the fan blade cover, the fan blade body and the first adhesive bond disposed between the fan blade body and the fan blade cover. It protects elements from the environment from contacting the first adhesive bond. In other words, the second adhesive layer is in a protective relationship with portions of the first adhesive bond that would be exposed to the atmosphere in the absence of the second adhesive layer. The second adhesive layer 208 has a first surface 212 that contacts the fan blade cover 204. The second surface 214 of the second adhesive layer 208 is opposite the first surface 212. The erosion-resistant coating 210 contacts the second adhesive layer 208 at the second surface 214.

As may be seen in the FIG. 4, the second adhesive layer 208 covers the entire surface of the fan blade body including the fan blade cover. It extends over the surface of the first adhesive bond 206 and directly contacts the first adhesive bond 206 protecting it from being contacted by the ambient atmosphere. The second adhesive layer forms a barrier layer to prevent atmospheric moisture from directly contacting the first adhesive bond. In an embodiment, the second adhesive layer 208 seals the joint between the fan blade body 202 and the fan blade cover 204 that contains the first adhesive bond 206. The second adhesive layer 208 contacts the fan blade cover 204 and a periphery 304 of the fan blade body 202 that surrounds the fan blade cover 204.

The second adhesive layer 208 comprises a second adhesive that has a greater strength and stiffness as compared with the first adhesive that is used in the first adhesive bond 206. The second adhesive layer has a decreased moisture permeation rate compared to the first adhesive bond. The second adhesive layer prevents moisture from contacting the first adhesive bond. The first adhesive bond 206 comprises the first adhesive that has greater toughness and impact strength when compared with the second adhesive that is used in the second adhesive layer 208. In an embodiment, the first adhesive bond 206 comprises a polyurethane resin (e.g., a polyurethane elastomer), while the second adhesive layer 208 comprises an epoxy adhesive that is crosslinked. The polyurethanes and polyepoxides are detailed above and will not be repeated here in the interests of brevity.

Disposed on the second adhesive layer 208 is an erosion-resistant coating 210. The erosion-resistant coating 210 is preferably an elastomer. Elastomers are tough and elastic and can absorb impact without deformation. They can return to their original shape after being deformed. They preferably have an elastic modulus of less than 200 megapascals (MPa), preferably less than 150 MPa, and more preferably less than 100 megapascals.

The elastomer may be a thermoplastic polymer, a blend of thermoplastic polymers, a thermosetting polymer, or a blend of thermoplastic polymers with thermosetting polymers. The elastomer may also be a blend of polymers, copolymers, terpolymers, or a combination thereof. The elastomer may be an oligomer, a homopolymer, a copolymer, a block copolymer, an alternating block copolymer, a random polymer, a random copolymer, a random block copolymer, a graft copolymer, a star block copolymer, a dendrimer, an ionomer, or the like, or a combination thereof.

Examples of elastomers are polysiloxanes, polybutadienes, polyisoprenes, styrene-butadiene rubber, poly(styrene)-block-poly(butadiene), poly(acrylonitrile)-block-poly(styrene)-block-poly(butadiene) (ABS), polychloroprenes, epichlorohydrin rubber, polyacrylic rubber, fluorosilicone elastomers, fluoroelastomer, perfluoroelastomer, polyether block amides (PEBA), chlorosulfonated polyethylene, ethylene propylene diene rubber (EPR), ethylene-vinyl acetate elastomers, or a combination thereof.

The elastomer used in the erosion-resistant coating is preferably one that is stable at the temperature of use of the fan blade. Preferred elastomers include those that contain a silicon atom, a fluorine atom, or both a silicon atom and a fluorine atom.

Examples include a polysiloxane elastomer, a fluorosilicone elastomer, a fluoroelastomer, a perfluoroelastomer, or a combination thereof.

In an embodiment, a method for bonding a fan blade cover to a fan blade body comprises applying a layer of adhesive precursor (or a layer of adhesive) to an inner surface of the fan blade cover. The adhesive precursor (or the adhesive) may be a polyurethane precursor, a polyurethane, a polyepoxide precursor, or a polyepoxide to the inner surface of the fan blade cover. The inner surface of the blade cover is permitted to contact the fan blade body. Pressure may be applied to the blade cover and the fan blade body to facilitate adhesion to each other via the first adhesive bond 206 (see FIG. 4). The temperature may be increased to facilitate curing of the adhesive precursor to form the first adhesive bond. The layer of adhesive precursor is cured to form an adhesive layer that secures the cover to the fan blade body.

In one manner of producing the bond (between the blade body and the blade cover) comprising the first adhesive, the respective uncured adhesive precursors are applied to the blade cover and the blade body in the desired regions. The blade cover is then made to contact the blade body. The blade body with the blade cover disposed thereon is then subjected to elevated pressure and temperature in an autoclave. In an embodiment, the pressure in the autoclave is 1 to 5, preferably 2 to 3 kilograms per square centimeter, while the temperature is 100 to 130° C., preferably 105 to 120° C. The adhesive precursors may undergo curing in the autoclave to form the cured first adhesive bond between fan blade body and the fan blade cover.

After removal from the autoclave, any adhesive that protrudes outside the blade cover may be removed. Finishing operations may be conducted on the blade as desired.

Following the formation of the first adhesive bond, the second adhesive layer is disposed on the fan blade in such a manner that it is in contact with the fan blade cover, the first adhesive bond and the portions of the fan blade body (that surround the fan blade cover). The second adhesive layer may comprise an initiator. The second layer may be applied by mixing a second adhesive precursor with the initiator and a suitable optional solvent to form a second adhesive mixture. The second adhesive mixture may be applied to the fan blade via spray coating, dip coating, roller blading, painting, or electrostatic spray painting. The second adhesive layer is then subjected to curing in an autoclave at pressures of 1 to 5, preferably 2 to 3 kilograms per square centimeter, while the temperature is maintained at 100 to 130° C., preferably 105 to 120° C.

Following the formation of the second adhesive layer, the erosion-resistant coating is applied to the second adhesive layer. The erosion-resistant coating comprises an elastomer which may be mixed with a suitable solvent and applied to the fan blade via spray coating, electrostatic spray painting, dip coating, roller blading, or painting. The solvent selected is dependent upon the elastomer selected for the erosion-resistant coating. A preferred method of applying the erosion-resistant coating is via spray coating or electrostatic spray painting. The fan blade may be subjected to annealing in an autoclave to facilitate drying and solvent removal.

The blade may then be installed in a gas turbine engine as shown in the FIG. 2 above.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade for an engine comprising:
a blade cover;
a blade body;
a first adhesive bond disposed between the blade cover and the blade body; where the first adhesive bond comprises a polyurethane elastomer;
a polyepoxide adhesive disposed on an entire surface of the blade cover and an entire surface of the blade body; where the polyepoxide adhesive is in a protective relationship with portions of the first adhesive bond that are exposed to the atmosphere in the absence of the polyepoxide adhesive.

2. The blade of claim 1, where the polyepoxide adhesive has a greater strength and stiffness as compared with an adhesive that is used in the first adhesive bond.

3. The blade of claim 2, where the adhesive used in the first adhesive bond has greater toughness and impact strength when compared with the adhesive that is used in the polyepoxide adhesive.

4. The blade of claim 1, further comprising an erosion-resistant coating disposed on the polyepoxide adhesive.

5. The blade of claim 4, where the erosion-resistant coating comprises an elastomer.

6. The blade of claim 5, where the elastomer comprises a silicon atom, a fluorine atom, or both a silicon atom and a fluorine atom.

7. The blade of claim 5, where the elastomer comprises a polysiloxane elastomer, a fluorosilicone elastomer, a fluoroelastomer, a perfluoroelastomer, or a combination thereof.

8. The blade of claim 1, where the polyepoxide adhesive contacts the first adhesive bond along an outer periphery of the blade cover.

9. The blade of claim 1, wherein the blade body and the blade cover both comprise one of aluminum, a ceramic matrix composite, or fiber-glass.

10. The blade of claim 9, where the fiber-glass comprises glass fibers and a polyepoxide or carbon fibers and a polyepoxide.

11. The blade of claim 1, where the polyepoxide adhesive has a decreased moisture permeation rate compared to the first adhesive bond.

12. A method for manufacturing a blade for an engine comprising:

applying a layer of adhesive precursor to an inner surface of a blade cover;

applying the inner surface of the blade cover to a blade body;

curing the layer of adhesive precursor to form a first adhesive bond between the blade cover and the blade body; where the first adhesive bond comprises a polyurethane elastomer;

applying a polyepoxide adhesive to an entire surface of the blade cover, that is opposed to the inner surface, and an entire surface of the blade body; where the polyepoxide adhesive is in a protective relationship with portions of the first adhesive bond that are exposed to the atmosphere in the absence of the polyepoxide adhesive.

13. The method of claim 12, where the polyepoxide adhesive has a greater strength and stiffness as compared with an adhesive that is used in the first adhesive bond.

14. The method of claim 12, further comprising disposing an erosion-resistant coating on the polyepoxide adhesive.

15. The method of claim 14, where the erosion-resistant coating is applied via a spray coating or electrostatic spray painting.

16. The method of claim 12, where the polyepoxide adhesive is applied via a spray coating, painting, dip coating, doctor blading or electrostatic spray painting.

* * * * *